United States Patent [19]
van Opijnen

[11] 3,857,082
[45] Dec. 24, 1974

[54] ELECTRONIC VOLTAGE REGULATOR FOR BATTERY CHARGING

[75] Inventor: L. J. Koenraad van Opijnen, Needham, Mass.

[73] Assignee: Tympanium Corporation, Woburn, Mass.

[22] Filed: Sept. 29, 1972

[21] Appl. No.: 293,493

[52] U.S. Cl............... 320/25, 320/40, 320/59, 323/22 SC
[51] Int. Cl.............................................. H02j 7/10
[58] Field of Search............ 320/20, 25, 39, 40, 9, 320/DIG. 2, 59, 60; 323/22 SC

[56] References Cited
UNITED STATES PATENTS

| | | | |
|---|---|---|---|
| 3,296,515 | 1/1967 | Knauth | 320/24 |
| 3,343,060 | 9/1967 | Ingraham | 320/40 |
| 3,365,645 | 1/1968 | Jacobs | 320/5 CR |
| 3,382,425 | 5/1968 | Legatti | 320/DIG. 2 |
| 3,487,284 | 12/1969 | Cady | 320/DIG. 2 |
| 3,543,127 | 11/1970 | Fry et al. | 320/39 |
| 3,553,561 | 1/1971 | Lesher | 320/39 |
| 3,571,608 | 3/1971 | Hurd | 320/25 |
| 3,576,487 | 4/1971 | Chase | 320/39 |
| 3,659,182 | 4/1972 | Snedecker | 320/25 |
| 3,697,850 | 10/1972 | Heinrich | 320/39 |
| 3,708,738 | 1/1973 | Crawford et al. | 320/9 |

*Primary Examiner*—James D. Trammel
*Assistant Examiner*—Robert J. Hickey
*Attorney, Agent, or Firm*—Weingarten, Maxham & Schurgin

[57] ABSTRACT

A voltage regulator circuit for charging a battery or other energy storage device from a source of fluctuating electrical potential. The regulator circuit provides charging of the battery from the fluctuating source when the voltage on the battery leads is within predetermined limits but when the potential across the battery leads is outside the predetermined limits conduction from the energy source is inhibited or the source is short circuited to prevent excessive voltage buildup at the battery terminals or circuit damage in the regulator under various abnormal conditions including incorrect polarity of the battery. In normal use, the battery is used to provide operating energy to a further circuit.

7 Claims, 9 Drawing Figures

3,857,082

ELECTRONIC VOLTAGE REGULATOR FOR BATTERY CHARGING

FIELD OF THE INVENTION

This invention relates to voltage regulators and in particular to a regulator for providing controlled charging of a battery or energy storage elements from a source of fluctuating voltage.

BACKGROUND OF THE INVENTION

Voltage regulators are commonly employed with internal combustion engines such as are found on recreational vehicles in order to charge a battery from a source of fluctuating electrical potential such as an electrical generator, alternator or magneto. Regulators operating on the current from generators or alternators typically operate to provide current to a battery until a predetermined battery voltage indicative of complete charge is reached at which time current charging is reduced to a trickle or eliminated entirely. In the typical case of magnetos employed in the ignition of recreational vehicles it is frequently desirable to employ magneto current to charge a lower voltage battery for running one or more vehicle fixtures. Here a regulator circuit is employed to drop the high voltage fluctuating output of the magnetos to a more useable low voltage DC potential.

It is not uncommon that the electrical source has a voltage output substantially higher than the desired battery voltage and in some cases, particularly with magnetos, the voltage level is dangerously high. In prior regulator circuits disconnecting the battery has permitted full voltage in the energy source to appear at the battery terminals creating a dangerous shock or spark hazard. Also, short circuiting of the battery terminals from the regulator circuit or connection of a battery in reverse polarity can, with prior art regulator circuits, damage the energy source or the regulator itself.

BRIEF SUMMARY OF THE INVENTION

These and other problems of prior voltage regulators are eliminated by the present invention which provides a voltage regulator circuit for charging of a battery or energy storage device from an energy source with a fluctuating potential and which provides interruption or diversion of the flow of current from the energy source in the event of an abnormal voltage condition appearing at the charge terminals for the battery.

In one preferred embodiment for the invention, current from the energy source is rectified by a controllable diode bridge and applied as a charging current to a battery. Conduction of the bridge is governed by a control circuit which detects the voltage condition on the bridge terminals applied to the battery to provide conduction of the bridge when the terminal voltage is above a first predetermined level or to inhibit conduction of the bridge when the battery voltage exceeds a second, higher predetermined level. In this manner disconnection or polarity reversal of the battery or short circuiting of the charging terminals will automatically disconnect the source from the battery as will the condition of fully battery charge when its output voltage reaches the second predetermined level.

In a further embodiment of the invention particularly suitable for energy sources running at near maximum current output, current from the energy source is applied through a controlled rectifier bridge to a battery for charging whenever the battery voltgae exceeds a minimum voltage level as detected by a control circuit for the rectifier bridge. When the battery voltage reaches a maximum charge level, a further control circuit responds to activate a shunt for the energy source to divert current from charging the battery. In this manner over voltage outputs at the battery terminals are eliminated particularly in conditions where the battery is disconnected, and damage from terminal short circuiting or battery polarity reversal is also prevented.

A further embodiment, also for the use with energy sources which run at near maximum current output, operates to control a rectifier bridge for conduction to charge a battery whenever the voltage of the battery terminal is within a predetermined range from a relatively low voltage to a maximum charge voltage. A second regulating function shunts the energy source to divert current from the battery whenever the battery terminal voltages exceed the maximum charge voltage by a further predetermined amount. This embodiment provides the regulation and protection functions of the previous two embodiments but by providing a predetermined voltage difference between the charge cutoff and source shunt levels eliminates the need for extremely heavy gauge conductors or Kelvin connections to the battery from the regulator.

BRIEF DESCRIPTION OF THE DRAWINGS

These and other features of the present invention can be more fully understood from the detailed description of the preferred embodiment presented below for purposes of illustration, and not by way of limitation, and from the accompanying drawings of which.

DETAILED DESCRIPTION OF THE PREFERRED EMBODIMENT

Figure 1A:
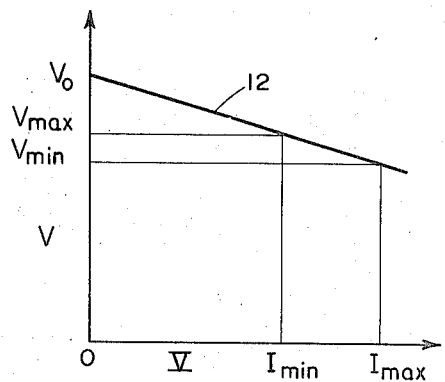
FIGS. 1A and 1B are energy source load diagrams useful in understanding the operation of the invention.
Figure 1B:
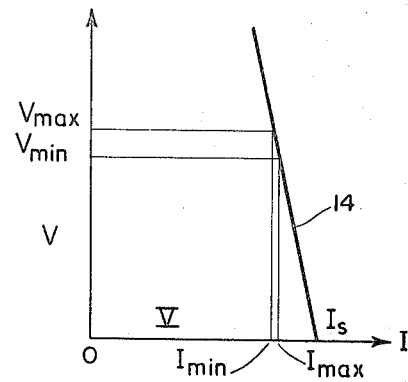

It is typical to find electrical energy generating devices associated with internal combustion engines used in utility or recreational vehicles such as outboard motors. Typically, the generators are designed for operation at either near maximum voltage output or near maximum current output, the conditions represented respectively by FIGS. 1A and 1B. In FIG. 1A a load line 12 represents the decrease in voltage output with increasing current which might be associated with a source of alternating power for an internal combustion engine designed for use at near the maximum voltage output. Typical operating points for the source of alternating power would be near the peak voltage Vo in the range between the indicated $V_{min}$ and $V_{max}$ and the corresponding $I_{min}$ and $I_{max}$ of FIG. 1A. In FIG. 1B a load line 14 represents typical loading characteristics for a type of magneto electrical generator and is indicated with corresponding $V_{min}$ and $V_{max}$ typical operating limits at respective $I_{min}$ and $I_{max}$ currents near the maximum current limit $I_s$.

Figure 2:
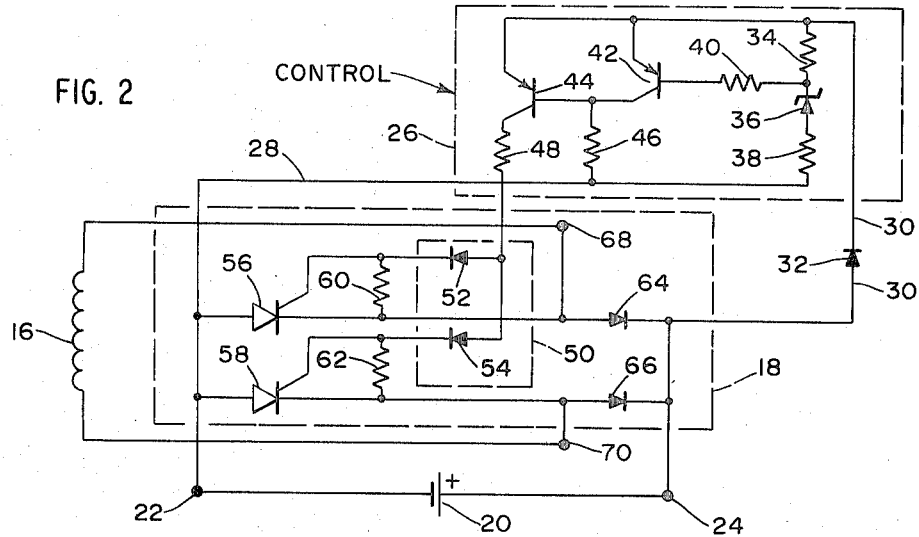
FIG. 2 is a circuit diagram of a single phase full-wave regulator circuit according to the invention particularly suited for use under conditions reflected by FIG. 1A.

With reference now to FIG. 2 a preferred regulator is shown in schematic diagram for use with a generator designed for operation in accordance with the conditions of FIG. 1A to provide regulation of charging current for a battery and to provide protection against abnormal conditions. In FIG. 2, the output coil 16 of a fluctuating or alternating current voltage source applied potential to a controllable bridge 18 from which charging current for a battery 20 is supplied through voltage output terminals 22 and 24 connected respectively to the anode and cathode of the battery 20. Conduction by the bridge 18 is governed by a control circuit 26 which responds to the voltage across the terminals 22 and 24 to provide a conduction control signal to the bridge 18.

The voltage across the terminals 22 and 24 is applied through respective conductors 28 and 30 to the control circuit 26. The conductor 30 includes a diode 32 connected to block reverse conduction. The circuit 26 receives the current of the diode 32 over the conductor 30 and applies it to a potentiometric voltage reference composed of a series connection of a resistor 34, Zener diode 36 and resistor 38 before continuing to the conductor 28. The reference voltage taken between the resistor 34 and Zener diode 36 is applied through a resistor 40 to the base of a grounded-emitter configuration PNP transistor 42 having the emitter connected to the conductor 30. The collector of transistor 42 is applied to the base of a grounded-emitter PNP transistor 44; that base being biased through a resistor 46 from the conductor 28. The collector of transistor 44 supplies current from the conductor 30 through a limiting resistor 48 to a gate circuit 50 within the bridge 18. In particular current from the resistor 48 is applied to anodes of first and second diodes 52 and 54. The diodes respectively conduct current to the control gate of silicon-controlled-rectifier diodes 56 and 58. Respective resistors 60 and 62 connected between the gates and cathodes of the SCRs 56 and 58 permit high temperature operation by bleeding to the cathode SCR internal leakage current between the anode and gate.

The anodes of the SCRs 56 and 58 are connected in common to the conductor 28 and their respective cathodes are applied to anodes of diodes 64 and 66. The junction between the cathode of SCR 56 and anode of diode 64 is excited through a terminal 68 from one end of the coil 16 while the junction between the cathode of SCR 58 and the anode of diode 66 is excited through a terminal 70 from the other end of the coil 16. The cathodes of diodes 64 and 66 are applied in common to the conductor 30.

In operation, no current will flow from the coil 16 to charge the battery 20 until a current flows through the transistor 44 and resistor 48 of sufficient magnitude to activate the gate of one of the SCRs 56 and 58. The particular SCR activated will be determined by the gate 50 such that the SCR with the lowest potential cathode will be activated exclusively. This provides proper polarity control so that only the SCR effective to conduct during that polarity from the coil 16 is activated. With activation of the appropriate SCR, current will flow from the coil 16 through a corresponding one of the diodes 64 and 66 to charge the battery 20 and return to the coil 16 through the activated SCR. The SCR's 56 and 58, however, can only be activated when sufficient current is conducted by the transistor 44. Transistor 44 will only conduct when the battery 20 provides a voltage significantly greater than zero volts of the right polarity to cause current flow through the emitter-collector junction of the transistor 44 and through the resistor 48 in a magnitude sufficient to activate either of the SCR's 56 or 58. When the voltage magnitude provided across the terminals 22 and 24 by the battery 20 exceeds slightly the reference voltage established by the Zener diode 36, the transistor 42 will be activated thereby eliminating the base bias of the transistor 44 and correspondingly turning it off such that the SCR's 56 and 58 can no longer be activated. This latter condition results from selection of the reference voltage which activates transistor 42 at a level corresponding to maximum charge of the battery 20.

It can be appreciated that the battery 20 be charged only up to a predetermined output level while short circuiting of the battery terminals 22 and 24, disconnection of the battery from the circuit, or applying in reverse polarity will operate to prevent conduction by the bridge 18 and thus eliminate the application of any electric potential or current at the terminals 22 and 24 from the coil 16.

Figure 3:
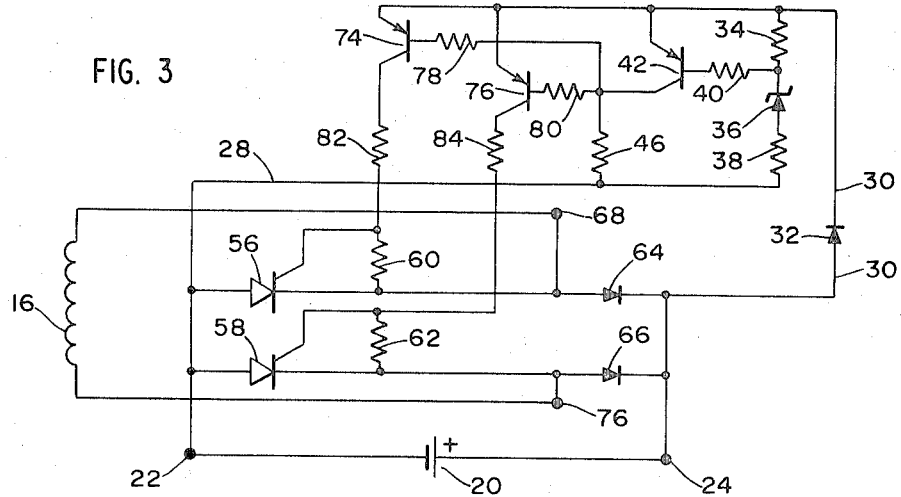
FIG. 3 illustrates a modification for the FIG. 2 embodiment.

With reference now to FIG. 3 a modification of the circuitry of FIG. 2 is indicated which provides an alternative to the gate 50. AS shown there the output of the collector transistor 42 drives the bases of first and second transistors 74 and 76 respectively through resistors 78 and 80. The collector of transistor 74 conducts current from the conductor 30 through a resistor 82 to the junction between the gate of SCR 56 and resistor 60 while the collector of transistor 76 similarly conducts through a resistor 84 to the junction between the gate of SCR 58 and resistor 62. According to the FIG. 3 implementation both SCR's 56 and 58 will be activated simultaneously for conduction to their gate electrodes but back biasing of one SCR will provide operation similar to that indicated in FIG. 2 so as to charge the battery 20 in the normal fashion for a full-wave bridge.

While the schematic diagrams of FIGS. 2 and 3 have indicated a full-wave implementation for charging the battery 20, it is possible to provide a half-wave rectification for charging the battery by, for example, in FIG. 2 eliminating the diode 64, the SCR 58 and associated resistor 62 and diode 54 and by short circuiting the diode 66. Also in this case the diode 52 may be short circuited as well. Similar control function is achieved in the half-wave charging form.

Figure 4:
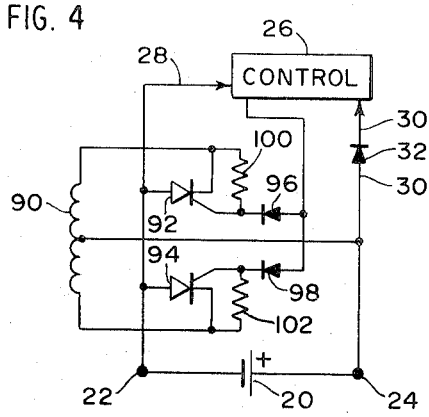
FIG. 4 represents a further modification for the FIG. 2 embodiment.

In FIG. 4 a full-wave rectification circuit is indicated wherein the coil of the generator employed is center tapped. Accordingly, a center tapped coil 90 is provided and has its center tapped terminal connected to the terminal 24 at the anode of the battery 20. The opposite ends of the coil 90 are applied respectively to cathode terminals of SCR's 92 and 94. The control circuit 26 provides as before, current through diodes 96 and 98 to the control gate terminals respectively of the SCR's 92 and 94 and respective resistors 100 and 102 bleed the gates to the cathodes. The anodes of SCR's 92 and 94 are connected in common to the conductor 28. The operation of the FIG. 4 circuitry is similar to that indicated above with respect to FIG. 2.

Figure 5:
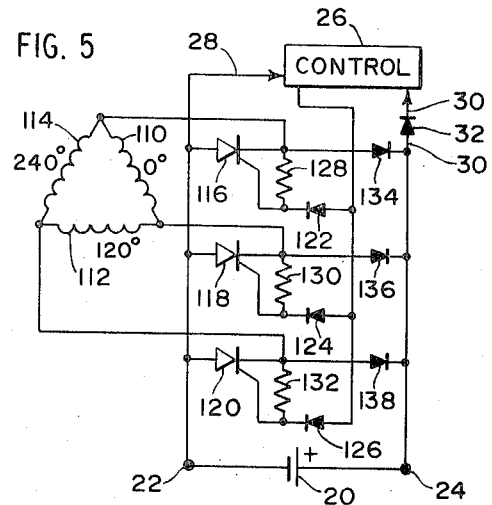
FIG. 5 represents a multiple-phase modification for the FIG. 2 implementation.

With reference now to FIG. 5 a modification is indicated for using the regulator circuitry with a poly-phase generator, in this case a three phase generator represented by the respective coils 110, 112 and 114 for the 0°, 120°, and 240° phases. The junction between the coils 110 and 114 is connected to the cathode terminal of an SCR 116, the junction between coils 110 and 112 connected to the cathode of an SCR 118 and the junction between coils 112 and 114 connected to the cathode of an SCR 120. The control current from control circuit 26 is applied through respective diodes 122, 124 and 126 into the control gates of the SCR's 116, 118 and 120 and respective resistors 128, 130 and 132 bleed the gates to the corresponding SCR cathodes. The anodes of the SCR's 116, 118 and 120 are connected in common to the conductor 28 and their cathodes are connected respectively to the anodes of diodes 134, 136 and 138. The cathodes of the diodes 134, 136 and 138 are connected in common to the conductor 30. By viewing each coil 110, 112 and 114 from the poly-phase generator and the corresponding SCR circuitry to which it is connected as a single FIG. 2 implementation, the operation of the FIG. 5 poly-phase circuitry in accordance with the principles indicated with respect to the FIG. 2 circuitry is clear.

Figure 6:
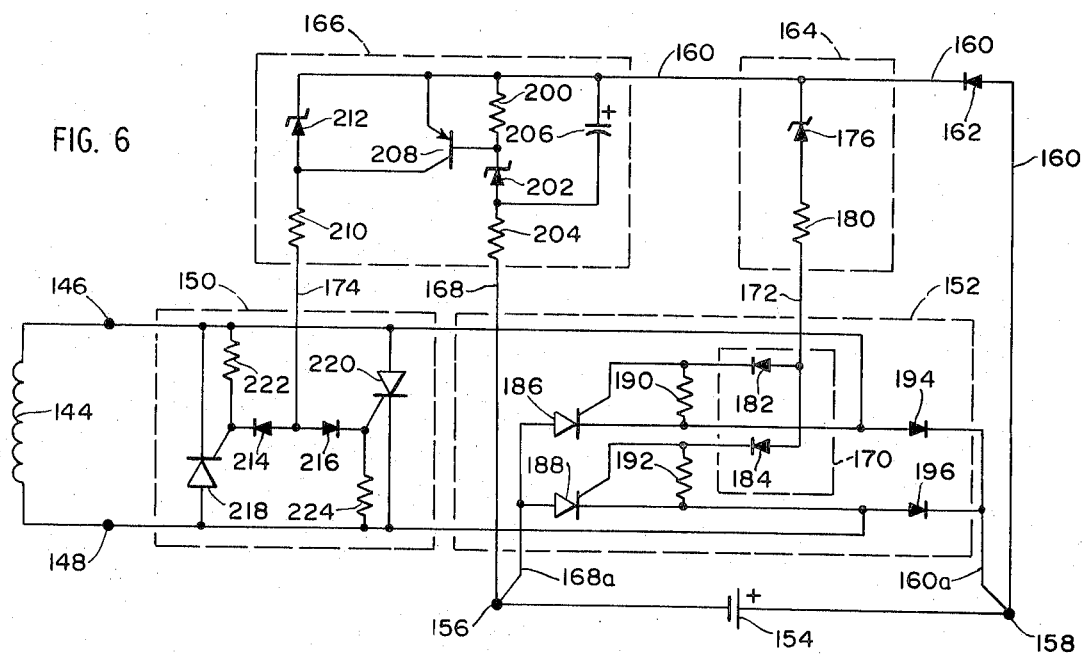
FIG. 6 is a circuit diagram of a further implementation according to the invention particularly suited for use under the conditions represented by FIG. 1B.

With respect to FIG. 6 there is shown a schematic diagram of an implementation of the invention specifically suited for use with a voltage generator adapted to be operated at near maximum current output in accordance with the loading shown in FIG. 1B. In FIG. 6 a coil 144 representing the output winding of such a generator, typically a magneto of a light weight two or four cycle engine such as an outboard motor, provides this excitation to terminals 146 and 148 for application to a controllable shunt circuit 150. The output of the shunt circuit is applied to a full-wave rectifier bridge 152 which provides a rectified output current for charging of a battery 154 through terminals 156 and 158 connected respectively to the anode and cathode of the battery 154. Current from the terminal 158 is applied on a conductor 160 through a diode 162 to first and second control circuits 164 and 166. Similarly, current from terminal 156 is applied through conductor 168 to the control circuit 166. Control circuit 164 provides a control signal on a line 172 through a gate 170 in the bridge 152 to enable conduction and rectification by the bridge 152 whenever the voltage across battery 154 exceeds the predetermined level significantly above zero. The control circuit 166 operates in response to detection of battery voltage above a predetermined maximum charge level to activate the current shunt circuit 150 over a line 174 to divert current of the coil 144 from the bridge 152 as by providing a low impedance shunt across the terminals 146 and 148.

Current from the conductor 160 is applied in control circuit 164 through a reference Zener diode 176 and a resistor 180 to line 172. From the resistor 180 line 172 conducts through parallel diodes 182 and 184 in the gate 170 into the control gates of respective SCR diodes 186 and 188. The gates of the SCR's 186 and 188 are connected through respective bleed resistors 190 and 192 to the corresponding cathodes. The cathodes of SCR's 186 and 188 are also connected to anodes of respective diodes 194 and 196 which in turn have their cathodes connected in common through a conductor 160a to terminal 158 permitting conductor 160 to act as a Kelvin lead. The anodes of diodes 186 and 188 are connected in common through a conductor 168a to terminal 156 permitting Kelvin use of lead 168. The cathodes of SCR diodes 186 and 188 are connected respectively to terminals 146 and 148 through the shunt circuit 150.

In operation, the Zener diode 176 will conduct current for activating either of the SCR DIODES 186 or 188 whenever the potential across battery 154 exceeds a predetermined limit determined by the Zener breakdown voltage. Removal or polarity reversal of the battery 154 or short circuiting of terminals 156 and 158 prevents the predetermined voltage from being reached or inhibits the flow of charging current to the battery 154 from the coil 144.

The control circuit 166 receives current from the conductor 160 at a voltage reference circuit comprising a series combination of a resistor 200, Zener reference diode 202 and resistor 204 which in turn is connected to the conductor 168. A capacitor 206 connected across the resistor 200 and diode 202 reduces the sensitivty of the control circuit 166 at high frequencies such as for short duration noise. The junction between the diode 202 and resistor 200 defining the reference level is applied to the base of PNP transistor 208, the emitter thereof being connected to the conductor 160. The collector of transistor 208 applies current through a resistor 210 to the shunt circuit 150. A Zener diode 212 is connected between the emitter and collector of transistor 208 in a direction to provide reverse breakdown conduction bypassing the emitter-collector circuit of the transistor 208.

Within the shunt circuit 150, current from the resistor 210 is applied on line 174 to the anodes of diodes 214 and 216 which have their respective cathodes connected to the control gates of SCR diodes 218 and 220. The gates of diodes 218 and 220 are also connected through respective bleed resistors 222 and 224 to the SCR cathodes and to the terminals 146 and 148. The anodes of SCR's 218 and 220 are connected respectively to the terminals 148 and 146.

In operation, the reference potential established at the base of the transistor 208 is selected to be above the reference potential of the Zener diode 176. Thus after the battery 154 has been charged from the coil 144 through the rectifier bridge 152, and when a predetermined maximum charge voltage is reached, as determined by the reference signal applied to the transistor 208, the SCR's 218 and 220 are activated to shunt respective, alternative cycles of current from the coil 144 to prevent the application of charging to the battery 154. The Zener diode 212 is incorporated to protect against excessively high voltages appearing at the terminals 146 and 148 in open circuit conditions of the bridge 152 resulting from removal of the battery 154 or other low voltage conditions.

Figure 7:
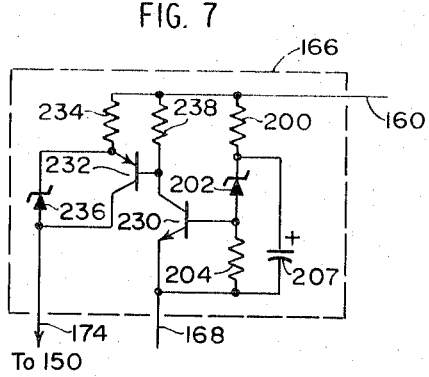
FIG. 7 is a schematic diagram of a modified control circuit for the implementation of FIG. 6.

With reference to FIG. 7 a modification for the control circuit 166 is indicated wherein the reference voltage between the resistor 200 and the Zener diode 204 is applied to the base of an NPN transistor 230. The transistor 230 has its emitter connected to the conductor 168 and its collector applied to the base of a PNP transistor 232. The PNP transistor 232 has its emitter connected through a resistor 234 to the conductor 160, and the collector thereof applied as before to the shunt circuit 150. A Zener diode 236 shunts the emitter-collector terminals of transistor 232 as indicated previously with respect to FIG. 6. The addition of transistor 230 provides amplification in the control circuit 166 to improve the output voltage regulation provided by the shunt circuit 150. The resistor 234 provides the current limiting function of the resistor 210 in FIG. 6, in the emitter circuit of transistor 232 instead of the collector circuit in order to limit the base current of transistor 232 to a safe value. The base of the transistor 232 is biased through a resistor 238 from the conductor 160. A capacitor 207 across Zener diode 202 and resistor 204 provides a function in the FIG. 7 circuitry similar to the function in the FIG. 6 circuitry of capacitor 206.

Figure 8:
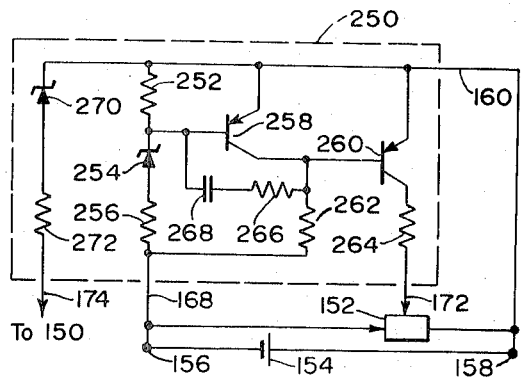
FIG. 8 is a circuit diagram illustrating an implementation of the invention which is a further modification of the circuitry of FIG. 6.

With reference to FIG. 8 a further implementation for the control circuits 164 and 166 is indicated with the single control circuit 250. Current from the conductor 160 is applied through a reference circuit composed of a series connection of a resistor 252, Zener diode 254 and resistor 256 to the conductor 168. The junction between resistor 252 and Zener 254 is applied to the base of a PNP transistor 258 having its emitter connected to the conductor 160 and its collector applied to the base of a further PNP transistor 260. The base of transistor 260 is biased through a resistor 262 from the conductor 168; its emitter is connected to conductor 160 and the collector of transistor 160 provides current through a resistor 264 on line 172 to the diodes within the gate 140 of the bridge as indicated in FIG. 6. A series connection of a resistor 266 and capacitor 268 is connected between the bases of the transistors 258 and 260 to adjust the loop gain of the regulator circuit comprising transistors 258 and 260 to provide a smooth regulation under changing loads and input conditions by introducing integration effects similar to capacitor 206 above. A Zener diode 270 receives on its cathode current from the conductor 160 and provides at its anode current through a resistor 272 to the diodes 214 and 216 of the shunt circuit 150. The rectifier circuit 152 may be connected directly to leads 160 and 168 without the use of Kelvin connections.

In operation, the transistors 258 and 260 permit conduction by the bridge 152 of FIG. 6 only when the voltage provided by the battery 154 of FIG. 6 exceeds a zero voltage level by a predetermined amount and is below a higher voltage level which is close to the maximum charge voltage of the battery 154. The Zener diode 270 is chosen with a value such that at a higher voltage level of the shunt circuit 150 is activated to shunt current from the coil 144 across the terminals 146 and 148 in FIG. 6. The operation of the transistors 258 and 260 prevents overcharging and at the same time protects against removal or polarity reversal of the battery 154 or short circuiting of the terminals 156 and 158. Transistor 258 can sense battery voltage in the absence of charging current to determine a full charge condition and inhibit circuit 152 conduction. This avoids the use of heavy wire of Kelvin connections since sensing is thus achieved over leads which are not carrying charge current at that time. The Zener diode 270 provides shunt regulation at a higher voltage level to avoid excessive voltages being applied in the regulator circuits. Because the Zener 270 senses the voltage between terminal 158 and either terminals 146 or 148 when the battery 154 is not charging, the use of additional Kelvin connections or heavy wire to limit the voltage drop in the sense wires is avoided. Additionally, with badly sulfated batteries, the resulting high internal resistance and applied voltage will tend to minimize charging current by activating Zener 270 as is desirable until the battery begins to recover.

Having described above a preferred embodiment for the present invention it will occur to those skilled in the art that alterations and modifications to the indicated circuitry can be made without departing from the spirit of the invention. Accordingly, it is intended to limit the scope of the invention only as indicated in the following claims.

What is claimed is:

1. A regulator for charging an energy storage element from a source of fluctuating electric potential said regulator comprising:
   means for receiving an AC charging current from said source of fluctuating electric potential;
   first and second terminals for application of rectified charging current to an electrical energy storage element;
   controlled conduction means including a controlled rectifier responsive to AC charging current from said source of fluctuating electrical potential for controlled rectification thereof to provide said rectified charging current across said terminals of said energy storage element;
   means for sensing the voltage across said terminals;
   means responsive to said sensed voltage being above a predetermined voltage level greater than zero and of the same polarity as said charging signal applied to said first and second terminals representative of the presence of an energy storage element in polarity for charging across said terminals for enabling said controlled conduction means to permit rectified conduction from said source of fluctuating electrical potential to said terminals;
   said enabling means including:
      means for detecting said first predetermined level to provide a first signal;
      means for applying a control signal to said controlled rectifier to provide conduction thereby in response to said first signal;
   means responsive to said sensed voltage being above a second predetermined level higher than said first predetermined level and of the same polarity for inhibiting conduction by said controlled conduction means;
   said inhibiting means including:
      means for detecting said second predetermined level to provide a second signal; and
      controlled rectifier means connected for providing a current shunt across said source of fluctuating potential in response to said second signal.

2. The voltage regulator of claim 1 further including:
   means for detecting a third predetermined level in said sensed voltage;
   said third predetermined level being between said first and second predetermined levels; and
   means responsive to detection of said third predetermined level for inhibiting the application of said control signal to said controlled rectifier.

3. A regulator for charging an electrical energy device from a source of fluctuating electric potential comprising:
  means for receiving fluctuating current of duel polarity from said source of fluctuating electrical potential;
  first and second terminals for applying a charging signal to said energy storage device;
  a rectifier network receiving said fluctuating current and providing rectification thereof in response to a control signal to produce said charging signal;
  said network including at least one controlled rectifier;
  a first circuit responsive to the signal at said first and second terminals and providing a first control signal to control said at least one controlled rectifier to conduct when the signal at said first and second terminals exceeds the zero level by a first predetermined magnitude representative of the connection of an energy storage element across said terminals in a polarity for charging;
  said first predetermined magnitude having the same polarity as said charging signal;
  at least one further controlled rectifier;
  a shunt circuit providing shunting of said fluctuating electric potential across said source through said at least one further controlled rectifier; and
  a second circuit responsive to the signal at said first and second terminals for providing a second control signal to control said at least one further controlled rectifier to shunt current across said source when the signal at said first and second terminals exceeds a second predetermined magnitude;
  said second predetermined magnitude being greater than and of the same polarity as said first predetermined magnitude.

4. The regulator for charging an electrical energy storage device of claim 3 wherein said first circuit further includes:
  control electronics responsive to the signal at said first and second terminals exceeding a third predetermined magnitude to inhibit the provision of said first signal;
  said third predetermined magnitude being intermediate said first and second predetermined magnitudes.

5. The regulator for charging an electrical energy storage device of claim 4 wherein said second circuit includes at least one stage of amplification in providing said first signal in response to the signal at said first and second terminals.

6. A regulator for charging an electrical energy device from a source of fluctuating electric potential comprising:
  means for receiving fluctuating current of dual polarity from said source of fluctuating electrical potential;
  first and second terminals for applying a charging signal to said energy storage device;
  a rectifier network receiving said fluctuating current and providing rectification thereof in response to a control signal to produce said charging signal;
  said network including at least one controlled rectifier;
  a first circuit responsive to the signal at said first and second terminals and providing a first control signal to control said at least one controlled rectifier to conduct when the signal at said first and second terminals exceeds the zero level by a first predetermined magnitude representative of the connection of an energy storage element across said terminals in a polarity for charging;
  said first circuit including:
    control electronics responsive to the signal at said first and second terminals exceeding a third predetermined magnitude to inhibit the provision of said first signal;
    said third predetermined magnitude being intermediate said first and second predetermined magnitudes;
  said first predetermined magnitude having the same polarity as said charging signal;
  at least one further controlled rectifier;
  a shunt circuit providing shunting of said fluctuating electric potential across said source through said at least one further controlled rectifier; and
  a second circuit responsive to the signal at said first and second terminals for providing a second control signal to control said at least one further controlled rectifier to shunt the current across said source when the signal at said first and second terminals exceeds a second predetermined magnitude, said second circuit including at least one stage of amplification having means for limiting its high frequency response;
  said second predetermined magnitude being greater than and of the same polarity as said first predetermined magnitude.

7. A regulator for charing an electrical energy device from a source of fluctuating electric potential comprising:
  means for receiving fluctuating current of dual polarity from said source of fluctuating electrical potential;
  first and second terminals for applying a charging signal to said energy storage device;
  a rectifier network receiving said fluctuating current and providing rectification thereof in response to a control signal to produce said charging signal;
  said network including at least one controlled rectifier;
  a first circuit responsive to the signal at said first and second terminals and providing a first control signal to control said at least one controlled rectifier to conduct when the signal at said first and second terminals exceeds the zero level by a first predetermined magnitude representative of the connection of an energy storage element across said terminals in a polarity for charging;
  said first circuit including at least one stage of frequency limited amplification;
  said first predetermined magnitude having the same polarity as said charging signal;
  at least one further controlled rectifier;
  a shunt circuit providing shunting of said fluctuating electric potential across said source through said at least one further controlled rectifier; and
  a second circuit responsive to the signal at said first and second terminals for providing a second control signal to control said at least one further controlled rectifier to shunt the current across said source when the signal at said first and second terminals exceeds a second predetermined magnitude;
  said second predetermined magnitude being greater than and of the same polarity as said first predetermined magnitude.

\* \* \* \* \*